Figure 1:
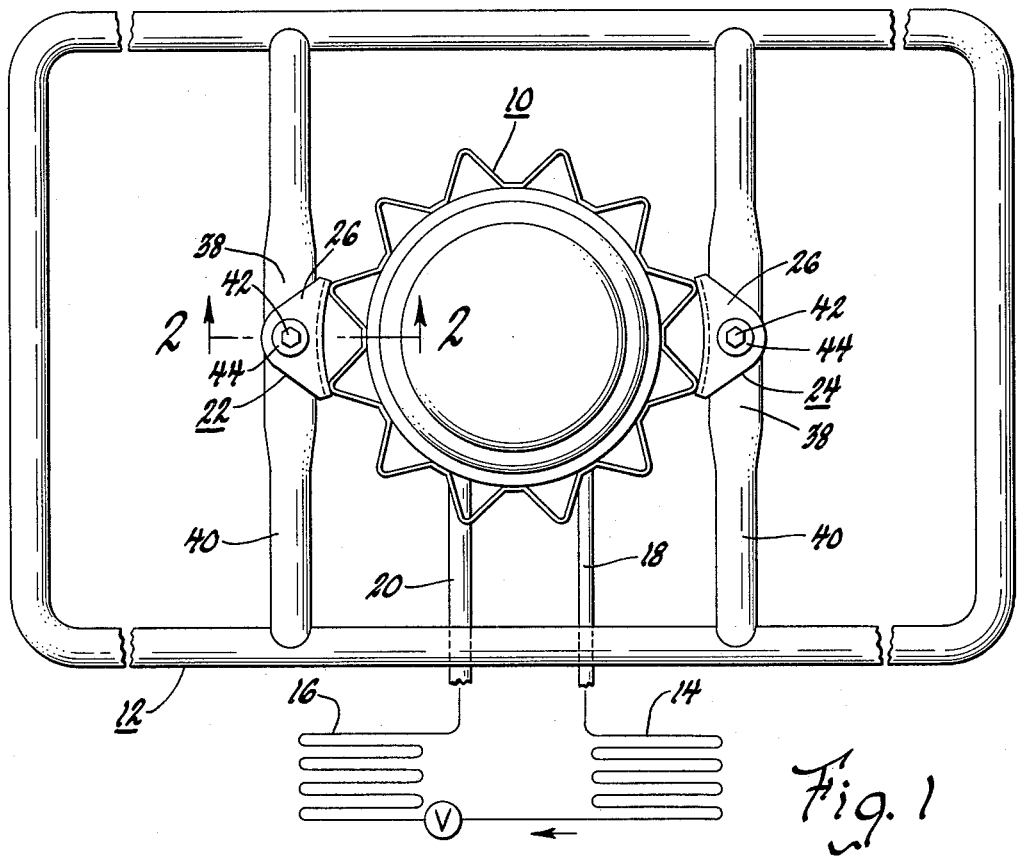

Nov. 30, 1965   M. R. BUTTS   3,220,676

MOUNTING ASSEMBLY

Filed April 1, 1964

INVENTOR.
Mervin R. Butts
BY
J. C. Evans
HIS ATTORNEY

United States Patent Office 3,220,676
Patented Nov. 30, 1965

3,220,676
MOUNTING ASSEMBLY
Mervin R. Butts, West Milton, Ohio, assignor to General Motors Corporation, Detroit, Mich., a corporation of Delaware
Filed Apr. 1, 1964, Ser. No. 356,516
2 Claims. (Cl. 248—15)

This invention relates to vibration damping means and more particularly to means for damping the transmission of vibrations from a suspended mechanism to a fixed supporting member.

In many systems suspended on vibration damping supports the suspended mechanism is often associated with tubing or the like that might when assembled distort the suspended mechanism sufficiently to locate it off center from a desired arrangement of supporting points on a fixed supporting base wherein portions of the mechanism might contact the supporting base to thereby cause undesirable noise or vibration transfer.

An object of the present invention, therefore, is to improve vibration damping mounts for compressors or the like by the provision of means for holding the suspended rotary mass centered with respect to its fixed support with the means being arranged to allow visual observation to determine if the suspended mass is centered with respect to the fixed support.

A further object of the present invention is to improve mounting systems for damping vibrations between a movable and a fixed member by the provision of an improved resilient mounting arrangement of low cost that is suitable for mass production and lends itself to such methods for processes including those wherein the supporting and supported frameworks are painted following installation of the vibration damping mounting means.

A further object of the present invention is to provide an improved compressor mounting arrangement including means for isolating compressor vibrations from a fixed supporting framework therefor and further including means for retaining the compressor assembly during processing and shipment thereof.

Further objects and advantages of the present invention will be apparent from the following description, reference being had to the accompanying drawing wherein a preferred embodiment of the present invention is clearly shown.

Figure 2:
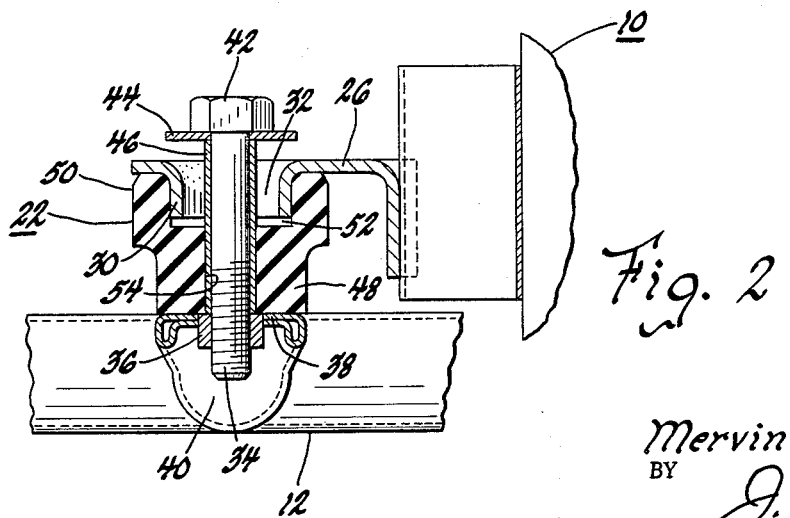

In the drawing:

FIGURE 1 is a view in top elevation of a support system including the mount of the present invention; and FIGURE 2 is a view in vertical section taken along the line 2—2 of FIGURE 1.

Referring now to the drawing, the invention is illustrated in a refrigeration system including a motor compressor unit 10 centered on a supporting framework 12 to be operatively associated with a refrigerant condenser 14, interconnecting expansion means and a refrigerant evaporator 16. A discharge conduit 18 and suction conduit 20, respectively, have their opposite ends in communication with compressor 10, condenser 14 and compressor 10, evaporator 16, respectively, to complete the refrigerant circuit.

As would be expected, during the mass production of refrigerant systems of the aforementioned type, it is important to be able to quickly and accurately locate the compressor 10 on its supporting framework 12 so that the ends of the refrigerant lines 18, 20 can be quickly coupled thereto during the mass production of the systems without causing undesirable contact between compressor and support. Thus, in accordance with certain of the principles of the present invention, a pair of diametrically opposite compressor mounting assemblies 22, 24 are constructed and arranged to enable the compressor to be accurately and continuously centered with respect to the support 12 even though standardized connecting lines are deformed from a particular length and configuration and mistakenly or otherwise unavoidably used in the assembly process.

More particularly, each of the compressor mounting assemblies 22, 24 comprises in the illustrated embodiment of FIGURES 1 and 2 a bracket 26 having one edge thereof secured to the outer shell of the compressor 10 by suitable fastening means, for example, welding. Each bracket 26 has a tubular extruded portion 30 depending therefrom to form an opening 32 in the top of the bracket 26. Cooperating with the bracket 26 is an elongated stud element 34 having a threaded end portion thereof threadably engaged in a pierce nut 36 secured by insertion in a flattened portion 38 of a tubular cross piece 40 of framework 12. The opposite end of the elongated stud element 34 has a head 42 integrally formed therewith which is representatively shown as being hexagonal in shape. The underside of the head is in engagement with one face of a washer 44 that bears against one end of a sleeve 46 having the inner surface thereof aligned with the outer surface of the stud element 34 in surrounding relationship therewith. The opposite end of sleeve 46 is held in engagement with the upper surface of the pierce nut 36 by threaded adjustment of the stud element 34 into the pierce nut 36 so as to cause the head 42 thereon to press downwardly on the washer 44. The washer 44 is dimensioned to overlap the edges of opening 32 in bracket 26 and accordingly the framework 12 and compressor 10 are held loosely together against any extreme relative movement therebetween either laterally or vertically of the centerline of the compressor.

By virtue of the above-described interrelationship between the stud 34, washer 44, sleeve 46 and bracket 26, the compressor 10 and framework 12 are retained together during the assembly of compressor to framework. A further feature of the invention is that the tubular portion 30 of bracket 26, in cooperation with stud 34, allows a visual observation of the relationship between compressor 10 and framework 12 to assure centering of compressor on framework.

Additionally, sleeve 46 and tubular portion 30 serve to support a spool 48 of resilient material that damps the transmission of vibrations from compressor 10 to the supporting framework 12. The spool 48 more particularly is characterized by a laterally enlarged end portion 50 having an opening 52 located centrally thereof so that the end 50 will fit over the outer surface of the tubular portion 30. The spool 48 further includes an axial opening 54 therethrough through which the sleeve element is directed so that the outer surface thereof is fit in tight engagement with a portion of the inner surface of the spool 48.

The end of the spool 48 opposite the end having the opening 52 therein abuts against the upper surface of the flattened portion 38 of tubular crosspiece 40 whereby the spool 48 will resiliently support the compressor 10 through the brackets 26 thereon upon the supporting framework 12.

The particular configuration of the spool 48 is thus seen to include a laterally enlarged end portion 50 that fits over the outer surface of the tubular portion 30 of bracket 26 and a smaller diameter portion that fits over the sleeve element 46. This particular shape performs the function of providing substantial resiliency in the direction of the axis of the elongated stud-like element 34 while providing a fairly rigid interconnection between the bracket 26 and the supporting framework 12 whereby any tendency for deformation of a standardized configuration in the conduits interconnecting the compressor with other portions of an assembly such as a refrigerant system to off-center the compressor unit is resisted. The resilient spool 48 can thereby be characterized as a damping element having a lesser resiliency in a direction perpendicular to the axis of the tubular stud element 34 as compared to the resiliency along an axis perpendicular thereto. The relatively increased resistance in the perpendicular direction will tend to offer increased resistance to off-center movement of the compressor when deformed tubes are fastened thereto and, accordingly, slight tube deformations in certain of the tubes being connected thereto will be overcome by offering a sufficient restraint to resist the tubes sufficiently to allow coupling thereof to the compressor without off-center movement thereof from predetermined desired locations with respect to the supporting framework therefor.

Another feature of the incerased resistance of the improved compressor mounting assembly is that the resistance to off-center movement of the compressor will allow a possible elimination of shipping clamps or the like that prevent undesirable lateral shifting movement of the compressor within the framework during shipping of the assembly.

In view of the aforesaid remarks, it is apparent that applicant has developed a low-cost compressor mounting assembly for damping vibrations that lends itself to mass production while allowing accurate assembly of a compressor with respect to a supporting framework and produces resistance to mislocation of the compressor because of tube deformation or the like from standardized tube configurations.

While the embodiment of the present invention as herein disclosed constitutes a preferred form, it is to be understood that other forms might be adopted.

What is claimed is as follows:

1. In a refrigerator assembly, the combination of, a refrigerant compressor, a base framework, a two-legged bracket having one of its legs secured to said compressor and the other of its legs directed radially outwardly of said compressor, said other leg having a depending tubular portion forming an index opening through said other leg for centering said leg relative to said framework, stud means having one end thereof fixed to said framework and the other end thereof directed upwardly through said tubular portion in centered relationship therewith as observed from a point above said compressor, a tubular damping element of resilient material having one end thereof in surrounding engagement with said stud means and the other end thereof located in spaced relationship with said stud means and fitted over the outer surface of said tubular portion, said one end of said damping element being in engagement with said framework and the other end of said damping element being in engagement with the underside of said leg portion, said one end of said damping element having a first outer diameter and the other end of said element having a larger outer diameter for producing a relatively greater damping action against lateral movement of said compressor with respect to said framework as compared to the damping action of said element against vertical movement of said compressor with respect to said framework, said tubular depending portion being in axial alignment with and spaced from said one end of said damping element to be abuttingly engageable therewith upon a predetermined vertical movement of the compressor toward said framework to limit such movement.

2. In the combination of claim 1, said stud means having a radially outwardly directed head portion including means spaced above and overlapping the edge of the opening through said other leg to limit vertical separation between said compressor and said framework during shipping.

References Cited by the Examiner

UNITED STATES PATENTS

| | | | |
|---|---|---|---|
| 2,514,811 | 7/1950 | Stephenson | 248—9 |
| 2,611,574 | 9/1952 | Davies et al. | 248—22 X |
| 2,666,301 | 1/1954 | Doeg | 62—295 |
| 2,716,566 | 8/1955 | Thiry | 248—358 |
| 2,751,147 | 6/1956 | Wurtz | 230—235 |
| 2,930,556 | 3/1960 | Horlacher | 248—15 |
| 3,006,159 | 10/1961 | Brown | 62—295 |

CLAUDE A. LE ROY, *Primary Examiner.*

WILLIAM J. WYE, FRANK L. ABBOTT, *Examiners.*